(12) United States Patent
Omichi et al.

(10) Patent No.: US 10,495,031 B2
(45) Date of Patent: Dec. 3, 2019

(54) HEATER FOR CANISTER

(71) Applicant: MAHLE FILTER SYSTEMS JAPAN CORPORATION, Tokyo (JP)

(72) Inventors: Junpei Omichi, Kawagoe (JP); Shuichi Eguchi, Tokyo (JP); Satoshi Seki, Shiki (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 610 days.

(21) Appl. No.: 15/338,976

(22) Filed: Oct. 31, 2016

(65) Prior Publication Data

US 2017/0167447 A1    Jun. 15, 2017

(30) Foreign Application Priority Data

Dec. 10, 2015 (JP) ................................ 2015-240715

(51) Int. Cl.
| | |
|---|---|
| *F02M 25/00* | (2006.01) |
| *F02M 25/08* | (2006.01) |
| *H05B 3/18* | (2006.01) |
| *H05B 3/04* | (2006.01) |
| *H05B 3/42* | (2006.01) |
| *B60K 15/03* | (2006.01) |

(52) U.S. Cl.
CPC ........... *F02M 25/0854* (2013.01); *H05B 3/04* (2013.01); *H05B 3/18* (2013.01); *H05B 3/42* (2013.01); *B60K 2015/03072* (2013.01); *F02M 2025/0881* (2013.01); *H05B 2214/03* (2013.01)

(58) Field of Classification Search
CPC ....... F02M 25/0854; F02M 2025/0881; H05B 3/04; H05B 3/18; H05B 3/42; H05B 2214/03

USPC ........ 219/429, 441, 438, 428; 123/516, 518, 123/519, 520; 96/126
See application file for complete search history.

(56) References Cited

U.S. PATENT DOCUMENTS

| | | | | |
|---|---|---|---|---|
| 4,103,658 A | * | 8/1978 | Bernecker | F02M 17/28 123/524 |
| 4,306,894 A | * | 12/1981 | Fukami | B01D 53/0446 123/519 |
| 4,387,291 A | * | 6/1983 | Keppel | F02M 31/135 123/543 |

(Continued)

FOREIGN PATENT DOCUMENTS

| | | |
|---|---|---|
| JP | 2013-249797 A | 12/2013 |
| WO | WO 02/064966 A1 | 8/2002 |

*Primary Examiner* — Viet Le
(74) *Attorney, Agent, or Firm* — Foley & Lardner LLP

(57) ABSTRACT

A heater for a canister includes a heater case embedded within an adsorption material and sealed at a top, and a heater core having a heat generation element and installed in the heater case. The bottom of the heater case is fitted into a heater retaining hole of a cap member in a hermetically-sealed state, for enabling the heat generation element and terminals of the heater core to be completely separated from the gas atmosphere containing the adsorbed fuel components within an activated carbon region. A leaf spring having a heat conductivity is arranged between an outside surface of one of a pair of strip-shaped ceramic plates constructing part of the heater core and an inner wall surface of the heater case, for retaining the heater core in place within the heater case and for permitting heat transfer from the heat generation element to the adsorption material.

4 Claims, 13 Drawing Sheets

(56) References Cited

U.S. PATENT DOCUMENTS

| | | | | |
|---|---|---|---|---|
| 4,387,691 A * | 6/1983 | Marcoux | B01D 35/18 | 123/557 |
| 4,477,715 A * | 10/1984 | Bell | F02M 31/125 | 219/205 |
| 4,512,324 A * | 4/1985 | Neary | F02M 31/125 | 123/549 |
| 4,598,686 A * | 7/1986 | Lupoli | F02M 25/0854 | 123/519 |
| 4,721,846 A * | 1/1988 | Lupoli | F02M 25/0854 | 123/549 |
| 4,722,314 A * | 2/1988 | Martinson | F02M 31/16 | 123/557 |
| 4,834,052 A * | 5/1989 | Hori | C04B 35/4682 | 123/549 |
| 5,044,346 A * | 9/1991 | Tada | F02B 51/06 | 123/536 |
| 5,349,934 A * | 9/1994 | Miyano | F02D 41/0032 | 123/519 |
| 5,861,050 A * | 1/1999 | Pittel | B01D 53/0438 | 123/519 |
| 6,098,601 A * | 8/2000 | Reddy | F02D 35/00 | 123/520 |
| 6,279,548 B1 * | 8/2001 | Reddy | B01D 53/02 | 123/519 |
| 6,343,591 B1 * | 2/2002 | Hara | B01D 46/0036 | 123/519 |
| 6,769,415 B2 * | 8/2004 | Reddy | F02M 25/0854 | 123/519 |
| 7,051,717 B2 * | 5/2006 | Meiller | F02M 25/0854 | 123/518 |
| 7,066,986 B2 * | 6/2006 | Haben | B01D 53/0423 | 95/106 |
| 7,448,366 B2 * | 11/2008 | Potier | F02M 25/08 | 123/519 |
| 7,488,376 B2 * | 2/2009 | Kim | B01D 53/0415 | 123/519 |
| 7,670,412 B2 * | 3/2010 | Kido | B01D 53/0438 | 123/519 |
| 7,785,407 B2 * | 8/2010 | Abe | B01D 53/0415 | 502/416 |
| 7,900,607 B2 * | 3/2011 | Lang | B01D 53/0407 | 123/518 |
| 7,909,024 B2 * | 3/2011 | Rea | B01D 53/0431 | 123/516 |
| 7,909,919 B2 * | 3/2011 | Kosugi | B01D 53/0407 | 123/519 |
| 7,922,797 B2 * | 4/2011 | Kosugi | B01D 53/0415 | 123/519 |
| 8,440,005 B2 * | 5/2013 | Lang | F02M 25/0854 | 96/126 |
| 8,685,152 B2 * | 4/2014 | Eschlbeck | B01D 53/0438 | 123/519 |
| 8,728,216 B2 * | 5/2014 | Sugiura | F28D 20/023 | 96/126 |
| 9,074,561 B2 * | 7/2015 | Makino | F02M 25/0854 | |
| 9,169,810 B2 * | 10/2015 | Shinagawa | F02M 25/0854 | |
| 9,334,837 B2 * | 5/2016 | Chung | B01D 53/002 | |
| 9,353,710 B2 * | 5/2016 | Meiller | F02M 27/00 | |
| 9,732,649 B2 * | 8/2017 | Hiltzik | B01D 53/0415 | |
| 10,208,713 B2 * | 2/2019 | Kim | F02M 25/0836 | |
| 2003/0005912 A1 * | 1/2003 | Koyama | F02M 25/08 | 123/520 |
| 2004/0094132 A1 * | 5/2004 | Fujimoto | B01D 53/0438 | 123/519 |
| 2009/0038477 A1 * | 2/2009 | Abe | B01D 53/0415 | 96/154 |
| 2010/0154755 A1 * | 6/2010 | Ichikawa | F02D 41/003 | 123/519 |
| 2010/0219086 A1 * | 9/2010 | Chabak | C01B 3/0005 | 206/0.7 |
| 2011/0220638 A1 * | 9/2011 | Wei | H05B 3/50 | 219/550 |
| 2012/0260893 A1 * | 10/2012 | Makino | F02M 25/0854 | 123/520 |
| 2012/0312281 A1 * | 12/2012 | Tsutsumi | F02M 25/089 | 123/519 |
| 2013/0037006 A1 * | 2/2013 | Kosugi | B01D 53/0415 | 123/520 |
| 2015/0107561 A1 * | 4/2015 | Makino | F02M 25/0854 | 123/519 |
| 2017/0145962 A1 * | 5/2017 | Dudar | F02M 25/0836 | |
| 2017/0167447 A1 * | 6/2017 | Omichi | F02M 25/0854 | |

* cited by examiner

HEATER FOR CANISTER

TECHNICAL FIELD

The present invention relates to a heater used for a canister that temporarily adsorbs evaporative fuel from a fuel tank of an automotive vehicle.

BACKGROUND ART

As is generally known, an automotive vehicle, which uses an internal combustion engine, is equipped with an evaporative fuel processing apparatus mainly constructed by a canister for suppressing evaporative fuel generated within a fuel tank from being discharged into the atmosphere.

The canister has a canister case filled with an adsorption material such as activated charcoal or carbon. The canister is configured to temporarily adsorb and trap evaporative fuel generated from within the fuel tank by the adsorption material in a vehicle stopped state where the internal combustion engine is stopped, and allow fuel components from the adsorption material to be desorbed by atmospheric air introduced through a drain port during operation of the engine, and purge the air containing the fuel vapor desorbed from the adsorption material (the activated carbon) into the intake system of the engine.

In recent years, such a canister, utilizing an adsorption material, is further equipped with an electric heater that heats the adsorption material for the purpose of promoting desorption of the adsorbed fuel components. Such heater-equipped canisters have been disclosed in patent document 1 (JP2013-249797 corresponding to U.S. Pat. No. 9,169,810 B2) and patent document 2 (International publication No. WO2002/064966 A1).

SUMMARY OF THE INVENTION

However, in prior-art heater-equipped canisters disclosed in the above patent documents 1 and 2, on one hand, a heater (or a heat generation element), which generates heat when electrically energized, is embedded within the adsorption material contained in the canister case in a state where the heater is exposed to the inside of the adsorption material. On the other hand, under a state where evaporative fuel has been adsorbed or trapped by the adsorption material, the inside of the canister case is filled with gas containing fuel components at high concentration. If a spark is produced between terminals of the heater, the gas atmosphere containing the high-concentration fuel components may be ignited.

Therefore, it would be desirable to separate a space within a heater case, which is embedded within an adsorption material and in which a heater core is installed, from the adsorption material, that is, the gas atmosphere containing fuel components adsorbed, such that the heat generation element of the heater core and/or the terminals of the heater core are kept out of contact with the fuel components.

Accordingly, it is an object of the invention to provide an improved heater for a canister capable of preventing gas containing fuel components adsorbed or trapped by an adsorption material from being ignited even if a spark is produced between terminals of the heater.

According to one aspect of the invention, a heater for a canister comprises a metal heater case, which is formed into a hollow tubular shape sealed at a top and embedded within an adsorption material contained in a canister case, a heater core having a heat generation element sandwiched by a pair of strip-shaped ceramic plates, and inserted and arranged in the heater case, and equipped with terminals led out of a bottom end of the heater core, an elastic member having a heat conductivity and arranged between an outside surface of at least one of the pair of strip-shaped ceramic plates and an inner wall surface of the heater case facing the outside surface of the at least one strip-shaped ceramic plate, and a synthetic-resin cap member having a heater retaining hole to which a connector portion of a bottom of the heater case is fitted in a hermetically-sealed state, and fitted onto a bottom-end opening of the canister case so as to hermetically cover the bottom-end opening.

The other objects and features of this invention will become understood from the following description with reference to the accompanying drawings.

DESCRIPTION OF THE PREFERRED EMBODIMENTS

The detailed description of one embodiment of a heater for a canister according to the invention will be given with reference to the accompanying drawings.

Figure 1:
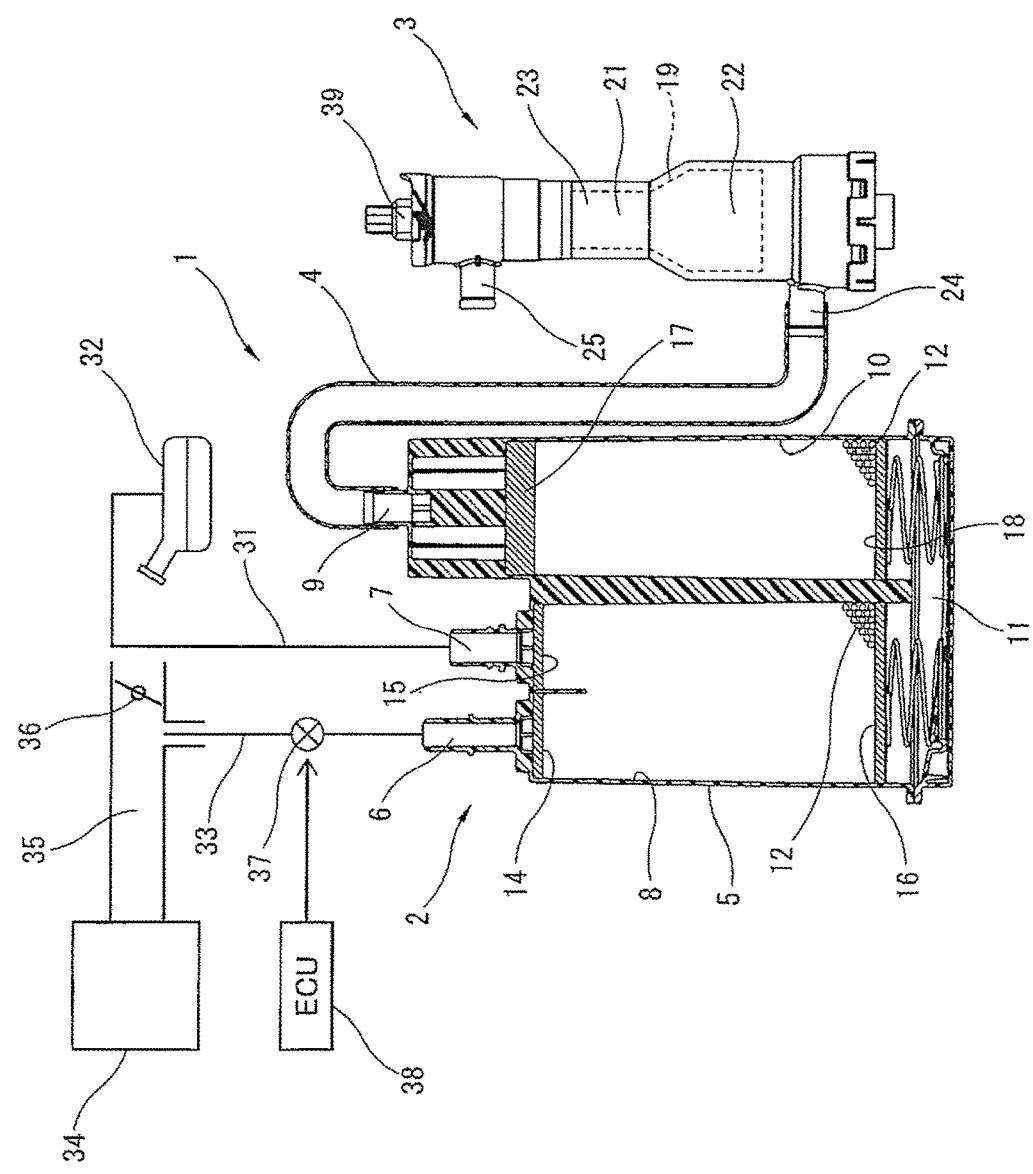
FIG. 1 is an explanatory view illustrating the entire configuration of an evaporative fuel processing apparatus in which a heater of the invention is installed in a buffer canister.

Referring now to the drawings, particularly to FIG. 1, a heater equipped canister according to the invention is exemplified in an evaporative fuel processing apparatus of an automotive vehicle. As a canister 1 that temporarily stores and adsorbs fuel components, the evaporative fuel processing apparatus of the embodiment is equipped with a main canister 2 serving as an unheated region and having a relatively large canister capacity and a buffer canister 3 serving as a heated region and having a relatively small, canister capacity. The main canister 2 and the buffer canister 3 are connected to each other through a flexible tube 4.

Main canister 2 has a synthetic-resin housing 5. The housing 5 includes an elongated rectangular cylindrical, first cylindrical part 8 integrally formed at one end (the top end, viewing FIG. 1) with a purge port 5 and a charge port 7 juxtaposed to each other, and an elongated rectangular cylindrical, second cylindrical part 10 integrally formed at one end (the top end, viewing FIG. 1) with a connecting port 9. These two cylindrical parts 8 and 10 are arranged adjacent to each other with a slight clearance, and formed integral with each other. The other end (the bottom end, viewing FIG. 1) of the first cylindrical part 8 and the other end (the bottom end, viewing FIG. 1) of the second cylindrical part 10 are communicated with each other via a communication passage 11. In this manner, the internal space of the housing 5 is configured as a continuous U-shaped internal volume, that is, a continuous U-shaped flow passage.

The inside of the first cylindrical part 8 and the inside of the second cylindrical part 10 are filled with granular activated carbon 12, serving as an adsorption material that permits adsorption/desorption of fuel components (e.g., gasoline vapor). More concretely, screen member 14 having a gas permeability is installed at the one end. (the top end) of the first cylindrical part. 8 as a partition between the purge port 6 and the internal space of the first cylindrical part 8 filled with the activated carbon. In a similar manner, a screen member 15 having a gas permeability is installed at the one end (the top end) of the first cylindrical part 8 as a partition between the charge port 7 and the internal space of the first cylindrical part 8 filled with the activated carbon. Also, a screen member 16 having a gas permeability is installed at the other end (the bottom end) of the first cylindrical part 8 as a partition between the communication passage 11 and the internal space of the first cylindrical part 8 filled with the activated carbon. Activated carbon 12 is filled within the volume of the internal space defined between the top screen-member pair 14, 15 and the bottom screen member 16. In a similar manner to the first cylindrical part regarding the second cylindrical part 10, a screen member 17 having a gas permeability is installed at the one end (the top end) of the second cylindrical part 10 as a partition between the connecting port 9 and the internal space of the second cylindrical part 10 filled with the activated carbon. A screen member 18 having a gas permeability is installed at the other end (the bottom end) of the second cylindrical part 10 as a partition between the communication passage 11 and the internal space of the second cylindrical part 10 filled with the activated carbon. Activated carbon 12 is filled within the volume of the internal space defined between the top screen member 17 and the bottom screen member 18.

On the other hand, buffer canister 3 has a synthetic-resin canister case, that is, a synthetic-resin, substantially cylindrical housing 21, which is formed independently from the housing 5 of main canister 2. In a similar manner to the main canister 2, the inside of the housing 21 of buffer canister 3 is filled with granular activated carbon, serving as an adsorption material. Buffer canister 3 is also equipped with an electric heater 19 installed in the housing 21, for heating the activated carbon. The housing 21 is formed into a substantially cylindrical hollow shape, comprised of a large-diameter part 22 having a relatively large diameter and a small-diameter part 23 having a relatively small diameter. The large-diameter part 22 and the small-diameter part 23 are arranged in series and formed integral with each other. The large-diameter part 22 has a connecting port 24 integrally formed on a side face of its bottom end. The small-diameter part 23 has a drain port 25 integrally formed on a side face of its top end. The connecting port 24 of buffer canister 3 is connected through the flexible tube 4 to the connecting port 9 of main canister 2.

With the previously-discussed arrangement, as a whole, regarding the canister 1, comprised of the main canister 2 and the buffer canister 3 three internal volumes, that is, the internal volume of the first cylindrical part 8, the internal volume of the second cylindrical part 10, and the internal volume of buffer canister 3, are configured substantially in series to each other, in a manner so as to provide a series of flow passages (i.e., a unique continuous flow-path configuration) continuously extending from the purge port 6 and the charge port 7, both located at one end of the series of flow passages to the drain port 25 located at the other end of the series of flow passages.

The aforementioned charge port 7 is connected through a charge passage 31 to the upper gaseous space of a fuel tank 32 of the automotive vehicle. The aforementioned purge port 6 is connected through a purge passage 33 to an intake passage 35 (exactly, part of the intake passage downstream of a throttle 36) of an internal combustion engine 34. A purge control valve 37 is interposed in the purge passage 33. The opening of purge control valve 37 is controlled by an engine control unit 38. Normally, drain port 25 is opened into the atmosphere, but in the shown embodiment an electromagnetic valve 39 is further added to the top of buffer canister 3, for shutting off or preventing the drain port 25 from being opened into the atmosphere, only as needed.

Hence, in the previously-noted canister 1, these three internal volume parts, that is, the first cylindrical part 8, the second cylindrical part 10, and buffer canister 3, are configured substantially in series to each other, to provide the unique continuous flow-path configuration. Both of the purge port 6 and the charge port 7 are located at one end of a flow direction of the unique continuous flow-path configuration, while the drain port 25 is located at the other end of the flow direction of the unique continuous flow-path configuration. In a conventional manner, in a vehicle stopped state where the engine 34 is stopped or during refueling of the vehicle, fuel vapor, generated within the fuel tank 32, is introduced through the charge port 7 into the canister 1, and then the introduced fuel vapor flows from the first cylindrical part 8 through the communication passage 11 and the second cylindrical part 10 toward the activated carbon region of buffer canister 3. During this phase in which the fuel vapor is flowing from the main canister 2 toward the activated carbon region of buffer canister 3, the fuel, vapor is adsorbed by the activated carbon particles installed in each of the first cylindrical part 8, the second cylindrical part 10, and the buffer canister 3. Then, during operation of the engine, atmospheric air (fresh air) is introduced or drawn through the drain port 25 into the buffer canister 3 by vacuum produced in the intake system. Hence, the introduced atmospheric air removes, desorbs, or purges the fuel components, temporarily adsorbed as discussed previously, from the activated carbon particles. Then, the desorbed fuel components, that is, the purge gas flows from the purge port 6 into the intake passage 35 of the engine 34, and thus the purge gas is finally burned in the engine 34.

In this manner, the adsorption phase and the desorption phase (the purge phase) of evaporative fuel within the canister 1 are repeated. Also, buffer canister 3, constructing part of the canister 1, is equipped with the electric heater 19 that heats the internal volume for the purpose of promoting desorption (purging) of fuel components during operation of the engine 34.

The detailed construction of buffer canister 3 that forms the essential part of the present invention, in particular, the detailed construction of heater 19, is hereunder described.

Figure 2:
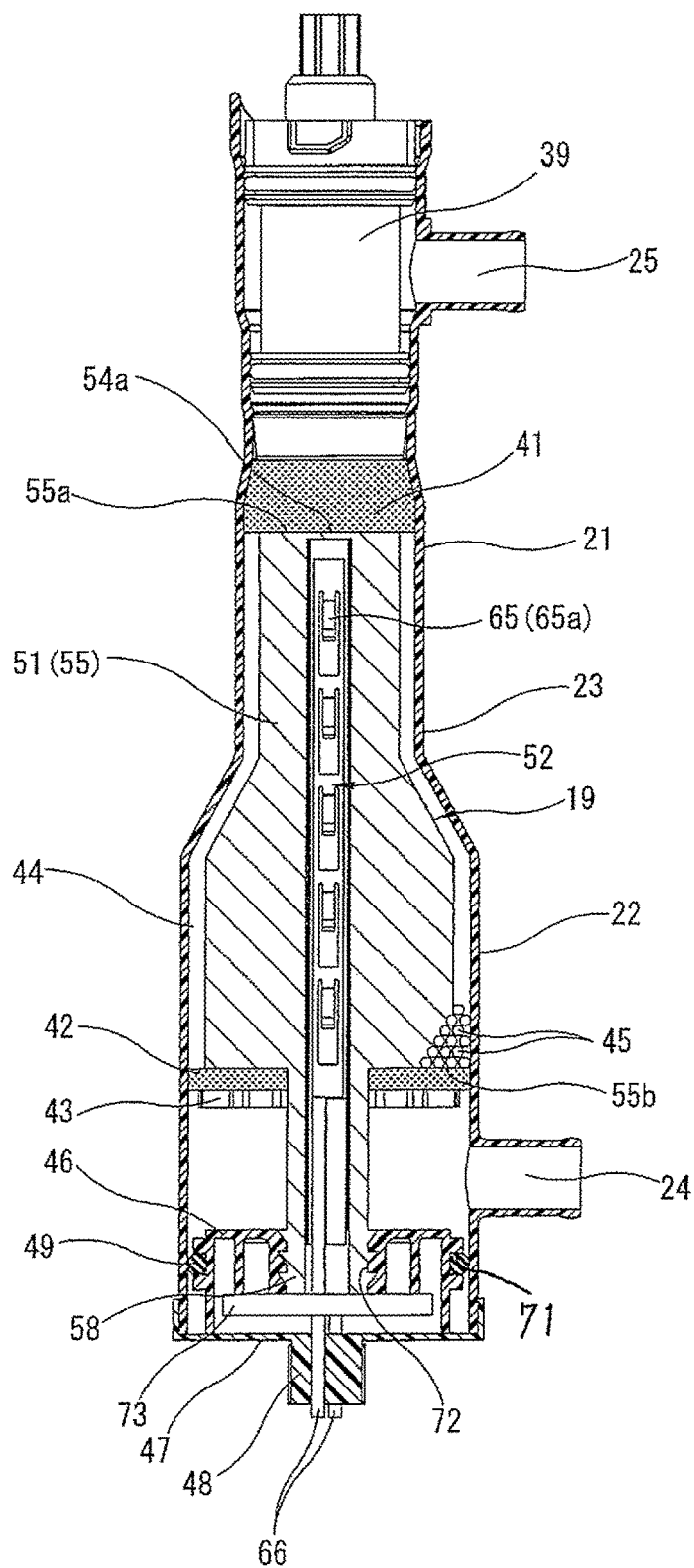
FIG. 2 is a longitudinal cross-sectional view illustrating the buffer canister equipped with the heater.
Figure 3:
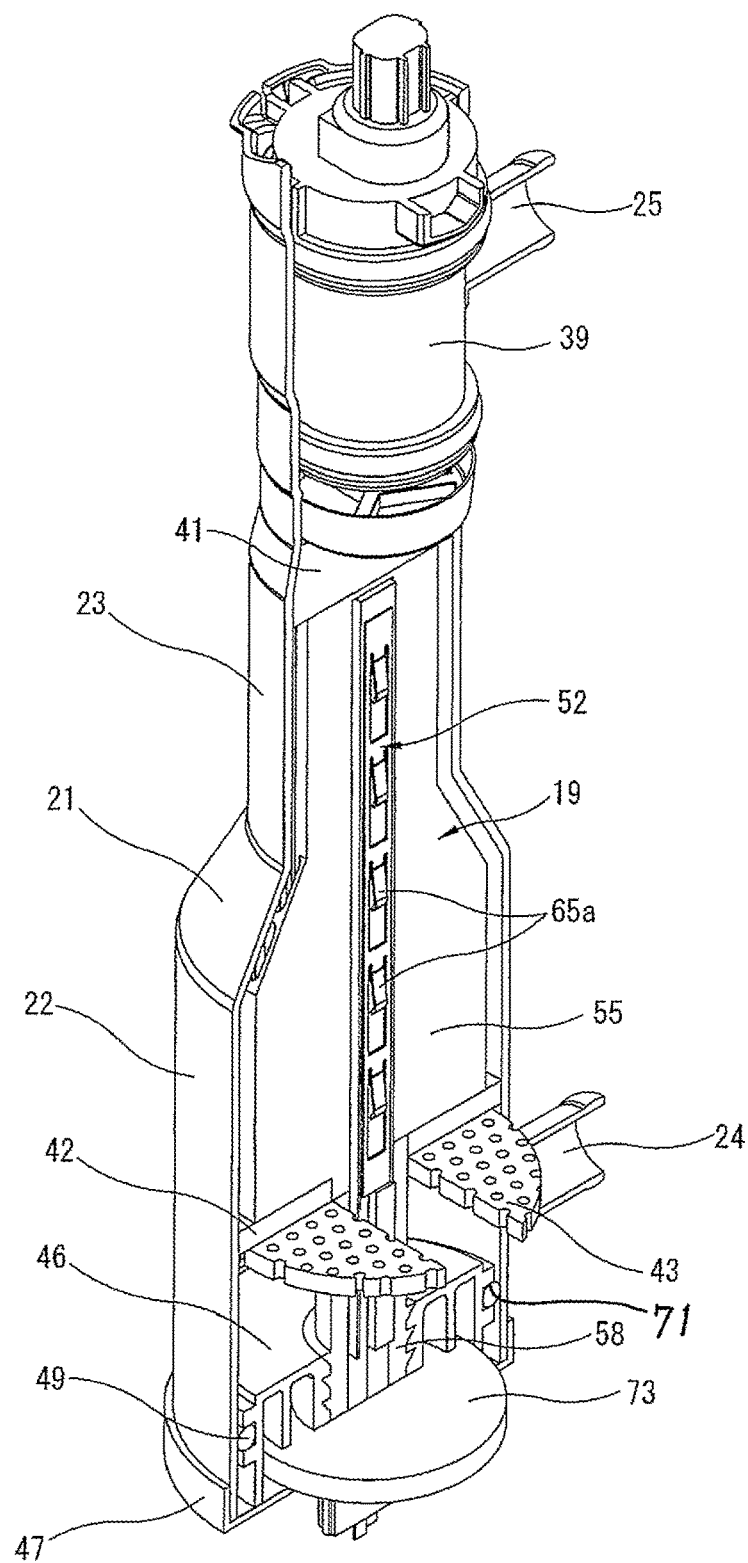
FIG. 3 is a perspective view illustrating the internal construction of the buffer canister, partly sectioned.

Referring now to FIGS. 2-3, there are shown the internal construction of buffer canister 3. A screen member 41 and a screen member 42 are installed inside of the buffer canister 3. The screen member 41 having a gas permeability is installed in the small-diameter part. 23 of housing 21, while the screen member 42 having a gas permeability is installed in the large-diameter part 22 of housing 21. The activated carbon region 44 of buffer canister 3 is partitioned with these two screen members 41 and 42 axially spaced apart from each other. The activated carbon region 44 is filled with an appropriate amount of activated carbon 45. For instance, each of screen members 41, 42 is made of polyurethane form or nonwoven fabric. The backface side of screen member 42 is supported by a synthetic-resin perforated plate 43.

Figure 4:
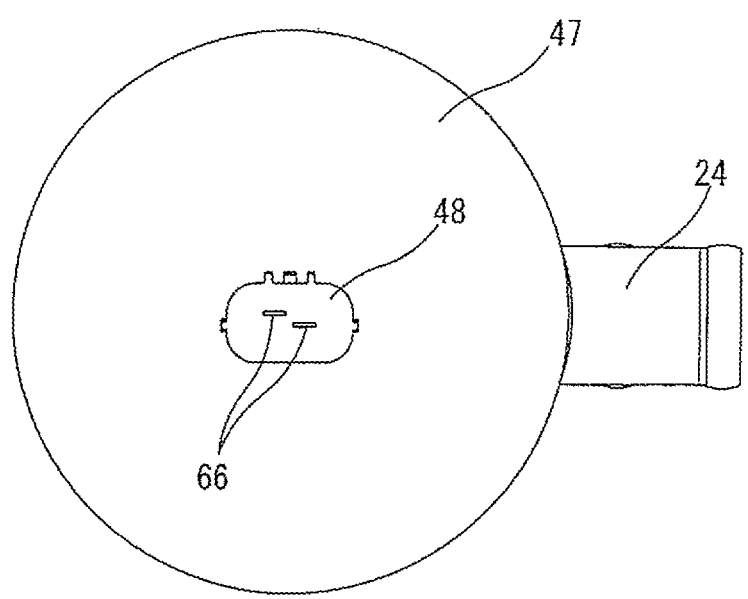
FIG. 4 is a bottom view illustrating the bottom end face of the buffer canister.
Figure 5:
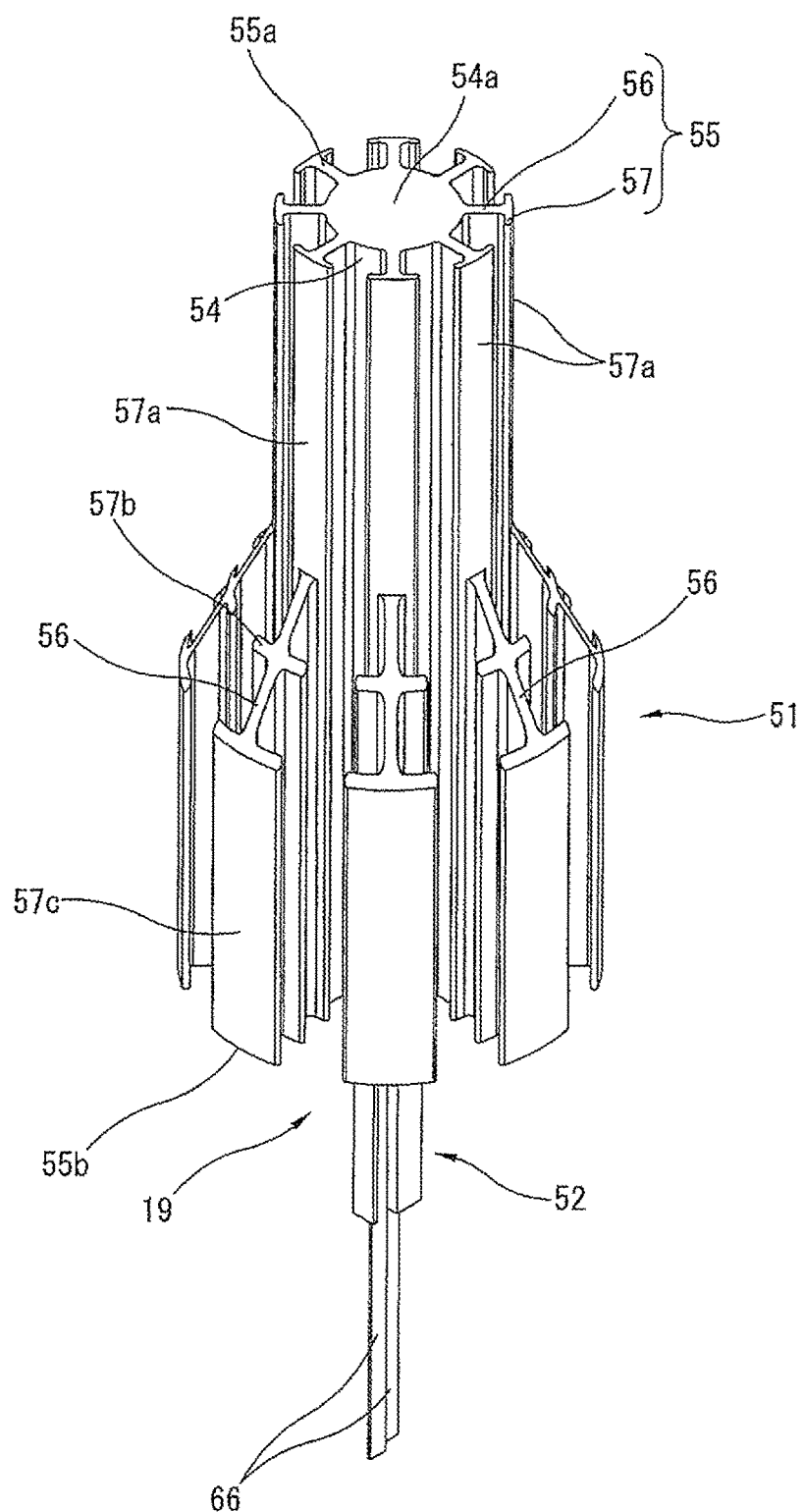
FIG. 5 is a perspective view illustrating a heater case into which a heater core is assembled.

A synthetic-resin inner cap 46, serving as a cap member, is installed or fitted into the bottom-end opening of the large-diameter part 22 of housing 21 via an O ring 49, serving as a gas-tight seal member. Thus, the bottom-end opening of the large-diameter part 22 of housing 21 is hermetically closed or sealed. Additionally, a synthetic-resin outer cap 47 is installed outside of the inner cap 46. The rim of outer cap 47 is fitted onto the bottom end of the large-diameter part 22 of housing 21. As best seen in FIG. 4, the center of outer cap 47 is formed as an axially-protruding terminal connector 48, to which a plug (not shown) is connected for connection between the heater 19 and an external wiring harness not shown.

As shown in FIGS. 5-8, heater 19 is comprised of a heater case 51 made of a metal material such as aluminum alloy having a superior heat conductivity and embedded within the activated carbon 45 of housing 21, and an elongated rod-shaped heater core 52 accommodated in the heater case 51.

Heater case 51 is constructed by a case main body 54 formed into a hollow tubular shape such that an axially-elongated heater core accommodation chamber 53 having a rectangular cross section is formed along the center line of the case main body, and a heat-radiation fin 55 integrally formed with the outer periphery of the case main body 54 for promoting heat-exchange with the activated carbon 45. As a whole, the outline of heat-radiation fin 55 is configured to be substantially conformable to the shape of the internal space of the activated carbon region 44, extending over the large-diameter part 22 and the small-diameter part 23 of housing 21 (see the perspective view of FIG. 5). Heat-radiation fin 55 is comprised of a plurality of radial fin portions 56 (e.g., eight radial fin portions in the shown embodiment) configured to extend radially outwardly straight from the outer peripheral surface of the case main body 54, and a plurality of circular-arc shaped fin portions 57 configured to extend circumferentially around the same central axis corresponding to the center line of the case main body 54 and combined with and formed integral with respective radial fin portions 56. Each of circular-arc shaped fin portions 57, which are combined with and formed integral with respective radial fin portions 56, is comprised of three kinds of circular-arc shaped fin portions 57a, 57b, and 57c, each configured along a different circle having the same center (corresponding to the center line of the case main body 54) but different diameter (see FIGS. 5 and 8). Each individual radial fin portion 56 of the axial portion of the case main body 54, which is configured to be substantially conformable to the small-diameter part 23 of housing 21, is formed to have only the small-diameter circular-arc shaped fin portion 57a having the smallest diameter of the three different diameters. In contrast, each individual radial fin portion 56 of the axial portion of the case main body 54, which is configured to be substantially conformable to the large-diameter part 22 of housing 21, is formed to have the middle-diameter circular-arc shaped fin portion 57b and the large-diameter circular-arc shaped fin portion 57c as well as the small-diameter circular-arc shaped fin portion 57a (see the perspective view of FIG. 5). These radial fin portions 56 and circular-arc shaped fin portions 57 are formed or configured axially parallel to the center line of the case main body 54 of heater case 51 (in other words, the center line of the substantially cylindrical housing 21), so as not to hinder or prevent the activated carbon 45 (exactly, the activated carbon particles) from being installed into the activated carbon region 44. Additionally, as appreciated from the perspective view of FIG. 5 and the lateral cross section of FIG. 8, an appropriate clearance is provided or defined between the two adjacent circular-arc shaped fin portions 57, 57 arranged circumferentially adjacent to each other.

Figure 6:
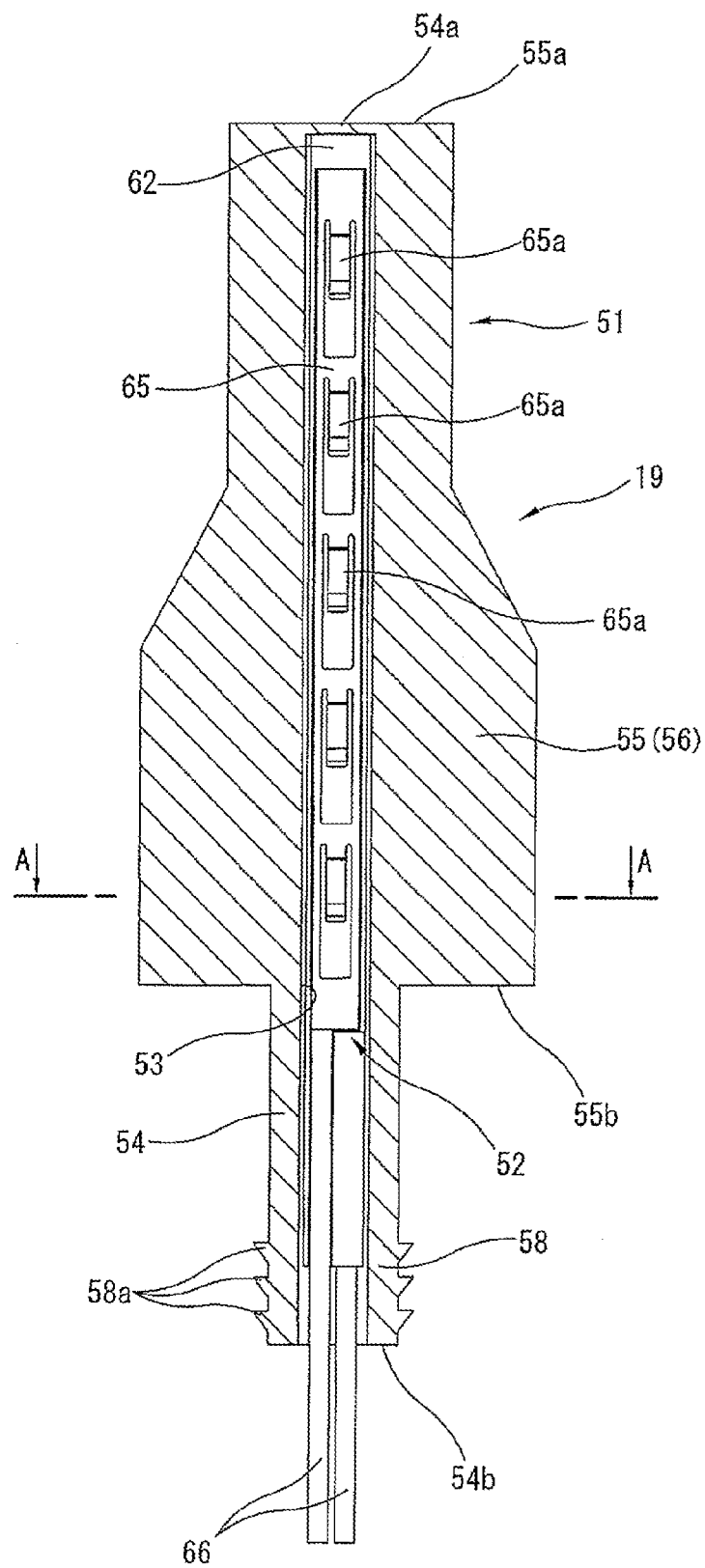
FIG. 6 is a longitudinal cross-sectional view illustrating the heater case into which the heater core is assembled.

The upper end edge 55a of heat-radiation fin 55 (on the side of the small-diameter part 23 of housing 21) and the lower end edge 55b of heat-radiation fin 55 (on the side of the large-diameter part 22 of housing 21) are formed along respective planes perpendicular to the center line of heater case 51. The upper end edge 55a of heat-radiation fin 55 (on the side of the small-diameter part 23) is formed to be flush with the upper end face 54a of the case main body 54. Part of the case main body 54 (on the side of the large-diameter part 22) is configured to further extend axially downward from the lower end edge 55b of heat-radiation fin 55 and formed into a substantially cylindrical hollow shape. The tip of the downwardly extending portion of the case main body 54 is structured or formed as a connector portion 58 having multi-stages of slip-off preventing annular protrusions 58a integrally formed on the outer peripheral surface of the connector portion. On one hand, the surface of each annular protrusion 58a, facing toward the lower end face 54b of the case main body 54, is configured as a moderate sloped surface. On the other hand, the surface of each annular protrusion 58a, upwardly facing apart from the lower end face 54b, is configured as a steep surface. As a whole, annular protrusions 58a are configured to have a saw-toothed cross section. In the shown embodiment, as one example of the multi-stage annular protrusions 58a, 58a, 58a, as seen in FIG. 6, the tip of the downwardly extending portion of the case main body 54, that is, the connector portion 58 is formed with three stages of annular protrusions 58a, 58a, 58a.

The lower end of previously-discussed heater core accommodation chamber 53 is opened on the lower end face 54b of the connector portion 58 of the case main body 54. In contrast, the top of heater core accommodation chamber 53, that is, the upper end face 54a of the case main body 54 (on the side of the small-diameter part 23 of housing 21), facing apart from the lower end face 54b, is sealed or closed. In other words, the heater core accommodation chamber 53 is structured as an elongated hole sealed or closed at its top end. For instance, heater case 51 and heat-radiation fin 55 are integrally formed by die-casting of aluminum alloy or the like. During the aluminum die-casting, the heater core accommodation chamber 53 is molded.

Figure 9:
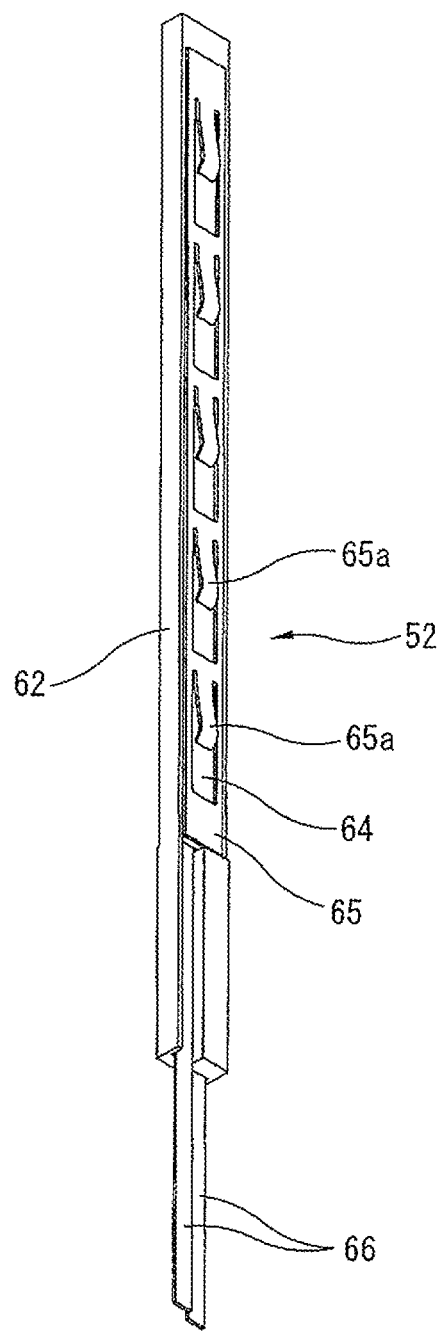
FIG. 9 is a perspective view illustrating the heater core itself.
Figure 10:
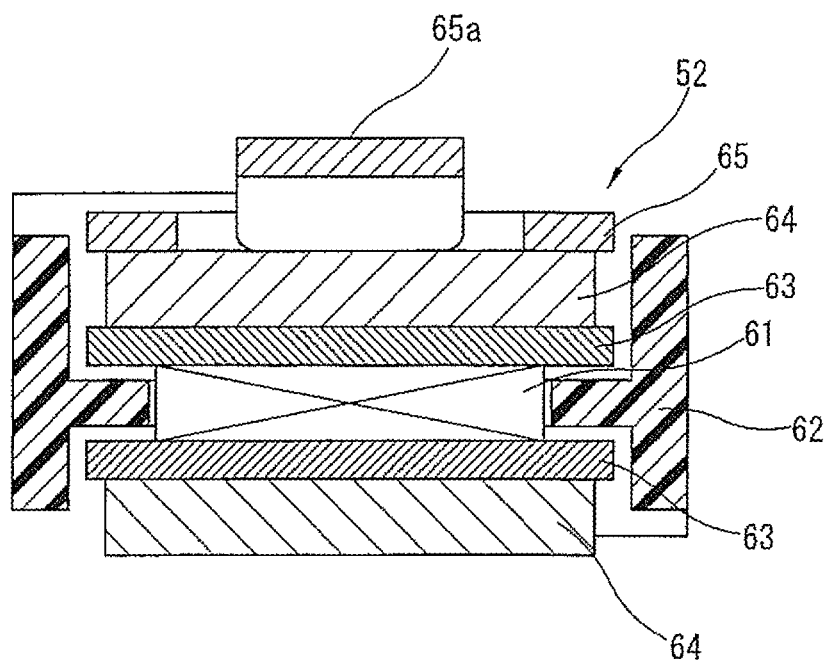
FIG. 10 is an enlarged lateral cross section illustrating the heater core itself.
Figure 11:
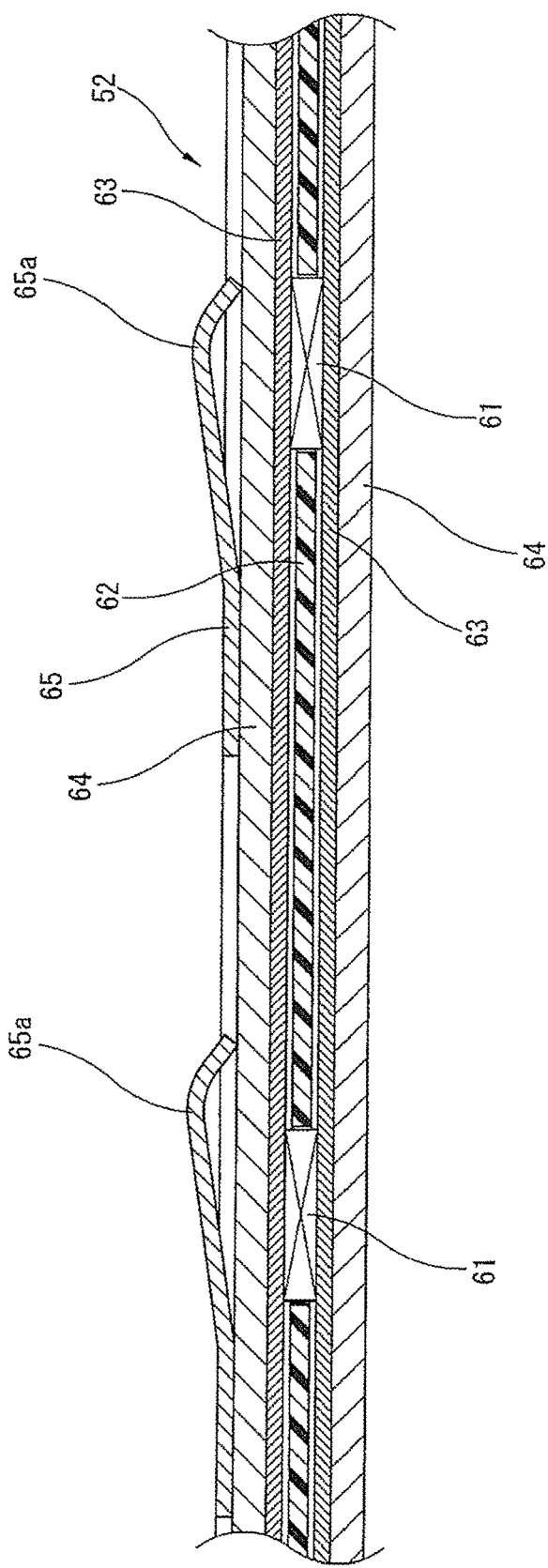
FIG. 11 is an enlarged longitudinal cross section illustrating the essential part of the heater core itself.

Referring now to FIGS. 9-11, there is shown the heater core 52 inserted and arranged in the heater core accommodation chamber 53 of heater case 51. Heater core 52 uses a plurality of positive temperature coefficient (PTC) heater elements 61, each serving as a heat generation element. As best seen in FIGS. 10-11, heater core 52 has a multi-layer laminated structure. That is, these PTC heater elements 61 are held or retained within respective openings of a synthetic-resin frame 62, having an H-shaped cross-section. Additionally, electrode plates 63, 63 are respectively affixed to both faces of an array of PTC heater elements. Additionally, strip-shaped ceramic plates 64, 64, made of ceramics such as alumina, are affixed to respective outside surfaces of electrode plates 63, 63. That is to say, heater core 52 is configured such that the array of PTC heater elements 61, 61, 61, . . . , whose both faces are equipped with respective electrode plates 63, 63, is further sandwiched by a pair of strip-shaped ceramic plates 64, 64 (see FIG. 11). Furthermore, a leaf spring 65, made of a metal material for example steel and serving as an elastic member having a heat conductivity, is affixed to the outside surface of one of ceramic plates 64, 64.

As best seen in FIG. 9, an elongated strip-shaped terminal 66 is led out of one end (the lower end, viewing FIG. 9) of each of electrode plates 63, 63 in the longitudinal direction, so as to protrude downward from one end (the lower end, viewing FIG. 9) of the synthetic-resin frame 62. That is, a pair of terminals 66, 66 are led out of the bottom end of heater core 52. In the shown embodiment, these two terminals 66, 66 are integrally formed with respective electrode plates 63, 63. In lieu thereof, terminal 66 and electrode plate 63, formed separately from each other, may be integrally connected to each other by welding.

As shown in FIG. 9, leaf spring 65 is configured as a belt-shaped spring member extending over almost the entire length of heater core 52, and formed as a series of equidistant-spaced leaf-spring portions. These leaf-spring portions are comprised of a plurality of rectangular elastic claw pieces 65a arranged in series to each other in the longitudinal direction of heater core 52. Each of claw pieces 65a is formed by cutting and raising a base material (a base metal) of the leaf spring 65 such that each individual claw piece 65a has a substantially triangular (boomerang-shaped) longitudinal cross section. The outside surface of each individual leaf-spring portion (i.e., each individual claw piece 65a), facing the top of heater core accommodation chamber 53 in a direction such that the leaf spring 65 is inserted into the heater core accommodation chamber 53, is configured as a relatively moderate tapered surface. The uppermost end of the tapered surface of each individual claw piece 65a, that is, the root of each individual claw piece 65a (positioned on the side of the top of heater core accommodation chamber 53), is connected to the base material.

Figure 7:
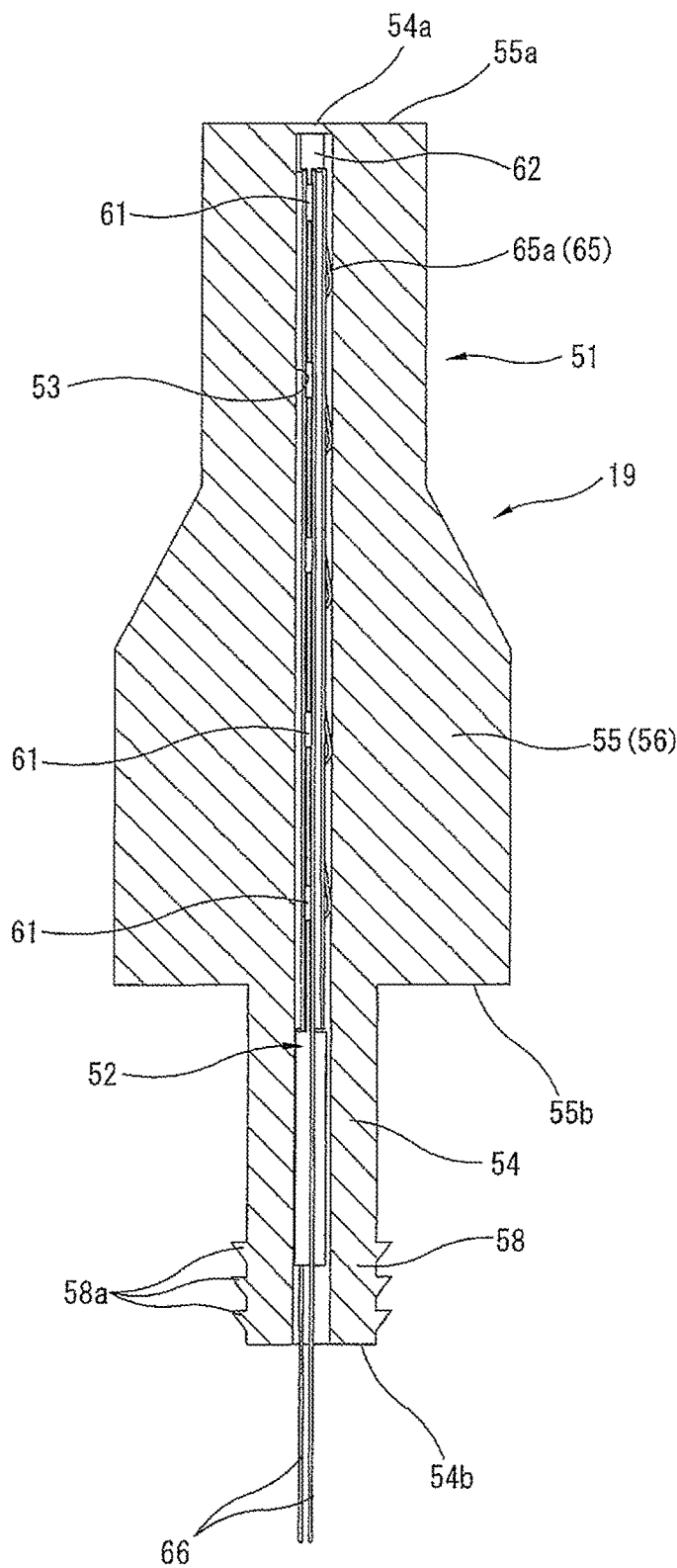
FIG. 7 is another longitudinal cross-sectional view of the heater case, cut along the plane different from the cross section of FIG. 6 by 90 degrees.
Figure 8:
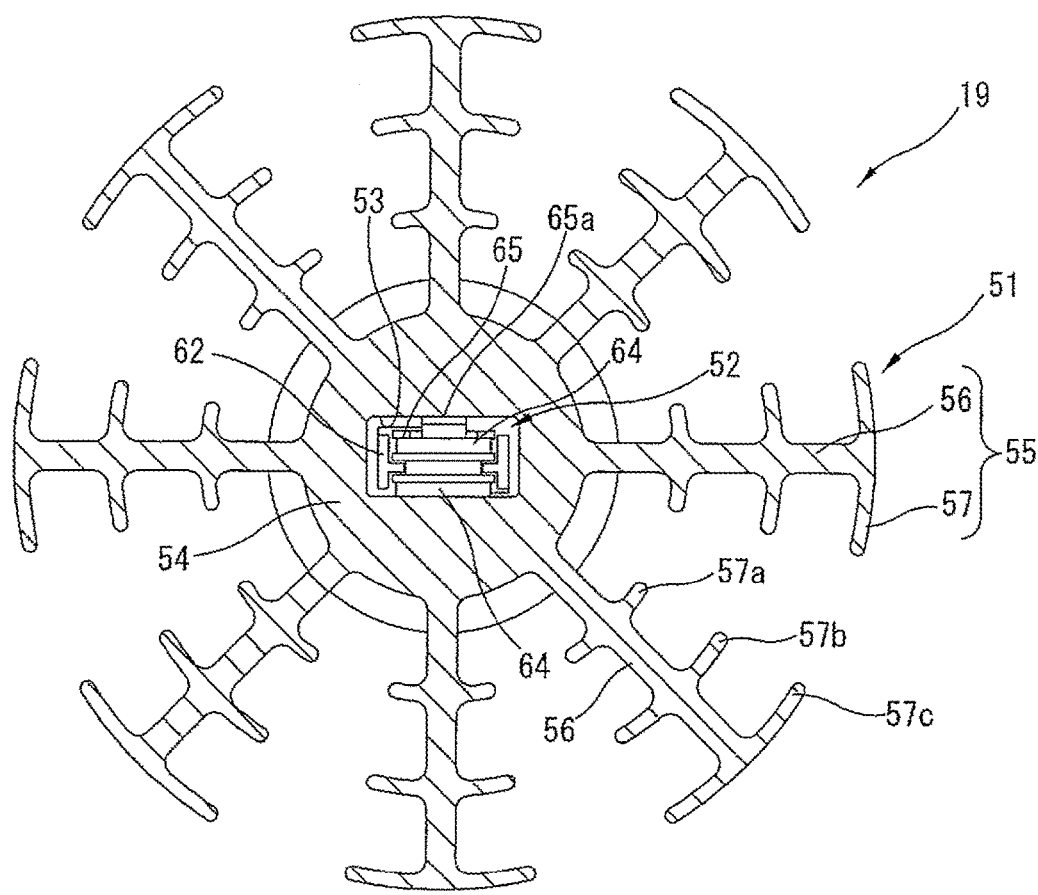
FIG. 8 is a lateral cross-sectional view taken along the A-A line of FIG. 6.

In a state where the heater core 52 has been inserted into the heater core accommodation chamber 53, as shown in FIGS. 6-7, the top of heater core 52 is kept in abutted-engagement with the sealed end of the top of the heater core accommodation chamber 53. Under this state, a region of heater core 52, in which the plurality of PTC heater elements 61 are arranged and thus the temperature tends to become substantially high, is positioned inside of the heat-radiation fin 55. The terminal pair 66, 66 is configured to extend through the interior of the case main body 54 of heater case 51, and further protrude in a manner so as to be led out to the outside of the lower end face 54b of the connector portion 58. Additionally, when assembled, heater core 52 is installed and inserted into the heater core accommodation chamber 53, while compressing each of claw pieces 65a, constructing leaf spring 65. Hence, as shown in FIGS. 7-8, the plurality of claw pieces 65a are brought into press-contact with the inner wall surface of one inside wall of the heater core accommodation chamber 53. By virtue of the reaction force, caused by the press-contact between the claw pieces 65a of leaf spring 65 and the inner wall surface of the heater core accommodation chamber 53, the other ceramic plate 64, to which leaf spring 65 is not affixed, kept in press-contact with the inner wall surface of the other inside wall of the heater core accommodation chamber 53, opposing to the inner wall surface of the one inside wall of the heater core accommodation chamber 53. Therefore, heat generated by the heater core 52 can be smoothly transferred to the case main body 54 of heater case 51 and further certainly transferred to the heat-radiation fin 55. Also, by virtue of the press-contact between the claw pieces 65a of leaf spring 65 and the inner wall surface of the heater case 51, there is a less tendency for the heater core 52 to oscillate within the heater core accommodation chamber 53 owing to vibrations during vehicle traveling.

In the assembled state of the heater-equipped buffer canister 3 as shown in FIGS. 2-3, the heat-radiation fin 55 is positioned within the activated carbon region 44. The lower end face of screen member 41 is kept in contact with the upper end edge 55a of heat-radiation fin 55 (on the side of the mall-diameter part 23 of housing 21). Also, the upper end face of screen member 42 is kept in contact with the lower end edge 55b of heat-radiation fin 55 (on the side of the large-diameter part 22 of housing 21). Screen member 42 and perforated plate 43, both positioned on the side of the large-diameter part 22, have respective central openings (through holes), into which the downwardly extending portion of the hollow tubular case main body 54, extending downward from the lower end of heat-radiation fin 55, is fitted or inserted. The tip of the inserted downwardly extending portion of the case main body 54, that is, the connector portion 58, reaches the inner cap 46. By the way, although it is not clearly shown in the drawings, the perforated plate 43 is axially positioned or retained on the inner peripheral surface of housing 21 through the use of an appropriate retaining or engaging structure. Instead of using such an appropriate retaining structure, inner cap 46 may be configured to have a leg for axially positioning the perforated plate 43.

As shown in FIGS. 2-3, inner cap 46 is configured to have an annular O-ring retaining groove 71 formed in the outer peripheral surface, for retaining the O ring 49. Inner cap 46 is also configured to have a heater retaining hole 72 (a through hole), which is formed through the central portion of inner cap 46 and into which the connector portion 58 of heater core 52 is fitted. The previously-noted heater retaining hole 72 is formed as a simple cylindrical bore having a cylindrical inside surface. The connector portion 58, which is formed integral with slip-off preventing annular protrusions 58a, is press-fitted to the simple cylindrical heater retaining hole 72. By virtue of press-fit of them, the saw-toothed connector portion 58 is tightly fitted into the simple cylindrical heater retaining hole 72 of the synthetic-resin, inner cap 46. As a result of this, the inner peripheral surface of the heater retaining hole 72 and the outer peripheral surface of the saw-toothed connector portion 58, tightly fitted to each other, form a gas-tight seal, and simultaneously provide a slip-off preventing structure. A circular basal plate 73 and an outer cap 47 are also placed or mounted on the bottom of inner cap 46. The terminal pair 66, 66 is configured to penetrate the center sections of the circular basal plate 73 and the outer cap 47 and reach the terminal connector 48.

With the previously-discussed configuration of the embodiment, heater core 52 is arranged in the heater core accommodation chamber 53 of heater case 51, sealed or closed at the top. Additionally, the tip of the downwardly extending portion of the case main body 54 of heater case 51, that is, the connector portion 58 is tightly fitted to the inner cap 46 so as to provide a gas-tight seal. This ensures a state where PTC heater elements 61, each serving as a heat generation element of heater core 52, and terminals 66, 66 are completely separated from the gas atmosphere containing the adsorbed fuel components within the activated carbon region 44. Hence, there is no possibility that the gas atmosphere containing the adsorbed fuel components is ignited, even if a spark is produced between the terminals 66, 66. By the way, the bottom end (the opening end) of the heater core accommodation chamber 53 communicates with the internal space defined between the inner cap 46 and the outer cap 47. However, the periphery of inner cap 46 is kept in a tightly-sealed relationship with the inner peripheral surface of housing 21 by means of the O ring 49 fitted into the O-ring retaining groove 71. Therefore, with the O ring 49 fitted to the retaining groove 71 of inner cap 46, there is no possibility that the bottom end (the opening end) of the heater core accommodation chamber 53 is brought into contact with the gas atmosphere within the activated carbon region 44.

Furthermore, on one hand, in the one ceramic plate 64 (the leaf-spring equipped ceramic plate) affixed to a first side of the heater core 52, heat of the heater core 52 is certainly transferred to the heater case 51 through the leaf spring 65 having a heat conductivity and interposed between the outside surface of the one ceramic plate 64 and the inner wall surface of heater case 51 (exactly, the heater core accommodation chamber 53). On the other hand, in the other ceramic plate 64 (the non-leaf-spring equipped ceramic plate) affixed to a second side of the heater core 52, the second side being opposite to the first side, the other ceramic plate 64 affixed to the second side of the heater core 52 is kept in direct-contact with the inner wall surface of heater case 51. Hence, heat of the heater core 52 is certainly transferred directly from the other ceramic plate 64 to the heater case 51. Furthermore, the heat transferred from the ceramic plate 64 to the heater case 51 is more effectively transferred through the combined heat-radiation fin 55 of radial fin portions 56 and circular-arc shaped fin portions 57 to the activated carbon 45. That is to say, it is possible to more effectively heat a comparatively small amount of activated carbon particles (activated carbon 45) installed in each of individual activated-carbon areas surrounded by radial fin portions 56 and circular-arc shaped fin portions 57 from the periphery (see FIG. 8). Thus, it is possible to more effectively heat the activated carbon particles (activated carbon 45) with a comparatively less electric power consumption.

As appreciated from the above, heater case 51, which is embedded within the adsorption material (activated carbon 45), is sealed or closed at the top, and the bottom of heater case 51 is fitted into the heater retaining hole 72 of the cap member (inner cap 46) in a hermetically-sealed state. Hence, a space within the heater case 51, in which heater core 52 is installed, can be certainly separated from the adsorption material, that is, the gas atmosphere containing fuel components adsorbed, and thus the heat generation element (PTC heater elements 61) of heater core 52 and/or the terminals 66, 66 of heater core 52 can be kept out of contact with the fuel components.

Furthermore, heat generated by the heat generation element (PTC heater elements 61) can be smoothly transferred through the strip-shaped ceramic plate pair 64, 64, the elastic member (leaf spring 65) having a heat conductivity, and the heater case 51 to the adsorption material (activated carbon 45). In the shown embodiment, in which the elastic member (leaf spring 65) is installed or affixed to only one ceramic plate 64 of the strip-shaped ceramic plate pair, the other ceramic plate 64 is kept in direct-contact with the inner wall surface of heater case 51. Hence, heat from the heat generation element (PTC heater elements 61) is smoothly transferred directly from the other ceramic plate 64 to the heater case 51. Additionally, by virtue of the elastic member (leaf spring 65) affixed to the one ceramic plate 64, the heater core 52 can be certainly retained or supported in place within the heater case 51. Thus, it is possible to certainly suppress noise and oscillating motion of the heater core 52 within the heater case 51 from occurring owing to vibrations during vehicle traveling. In the shown embodiment, the elastic member (leaf spring 65) is affixed to only the one ceramic plate 64. In lieu thereof, elastic members (leaf springs 65, 65) may be affixed to respective ceramic plates 64, 64, to enhance the ability to retain or support the heater core 52 within the heater case 51. As an elastic member, a leaf spring, made of a metal material and having a heat conductivity, is used. In the shown embodiment, as an elastic member, actually, a belt-shaped leaf spring 65 comprised of a plurality of rectangular elastic claw pieces 65a is used. In lieu thereof, a silicon rubber having a heat conductivity (i.e., a heat-conductivity silicon rubber) may be used.

Moreover, with the heater case 51 formed integral with the combined heat-radiation fin 55 of radial fin portions 56 and circular-arc shaped fin portions 57, heat-transfer from the heat generation element (PTC heater elements 61) to the adsorption material (activated carbon 45) can be remarkably enhanced.

Figure 12:
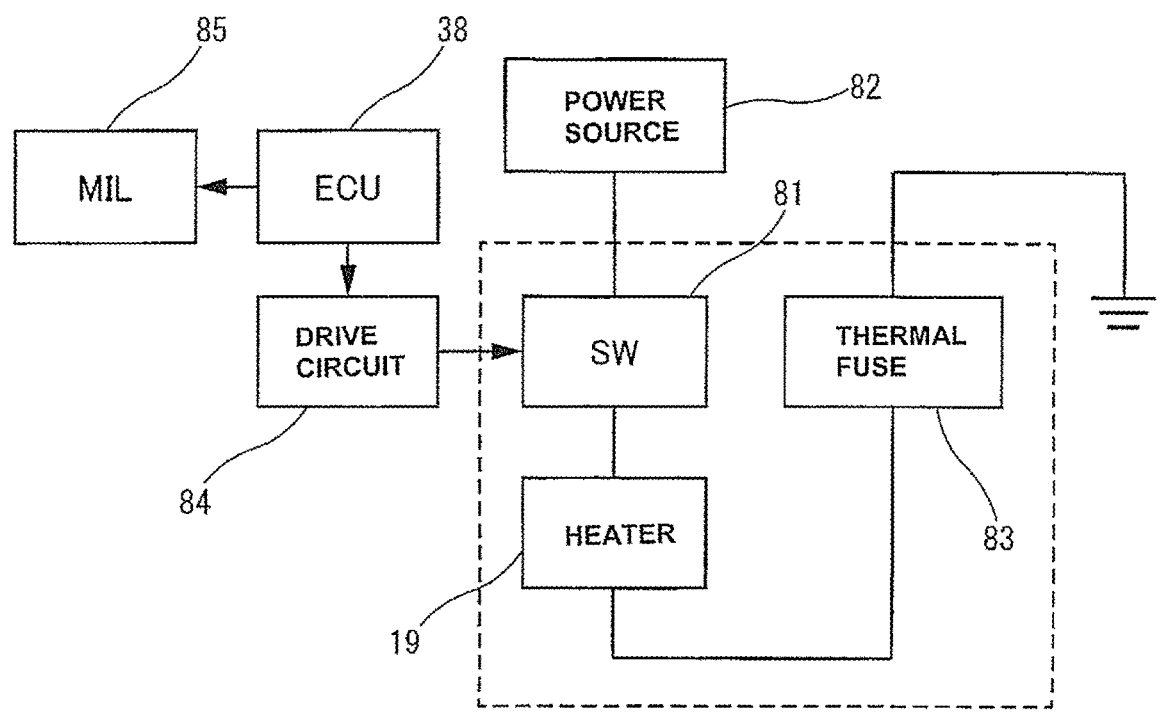
FIG. 12 is a circuit diagram illustrating the circuit configuration of the heater.

Referring to FIG. 12, there is shown one example of the circuit configuration for the heater 19 incorporated in the previously-discussed evaporative fuel processing apparatus. As seen in FIG. 12, heater 19 is connected through a switching element 81, such as a transistor, to an electric power source 82 (for example, a car battery). A thermal fuse 83 that melts at a predetermined temperature is further disposed in the circuit and arranged in series to the heater 19. It is preferable to arrange or lay out both the switching element 81 and the thermal fuse 83 within the buffer canister 3. For instance, it is more preferable to install these electrical component parts 81 and 83 on the previously-discussed circular basal plate 73. The switching element 81 is controlled by the engine control unit (ECU) 38 through the use of a drive circuit 84. In the shown embodiment, the circuit is also provided with a malfunction indicator light (a warning light) 85, for informing about an abnormality (a failure) in heater 19.

Figure 13:
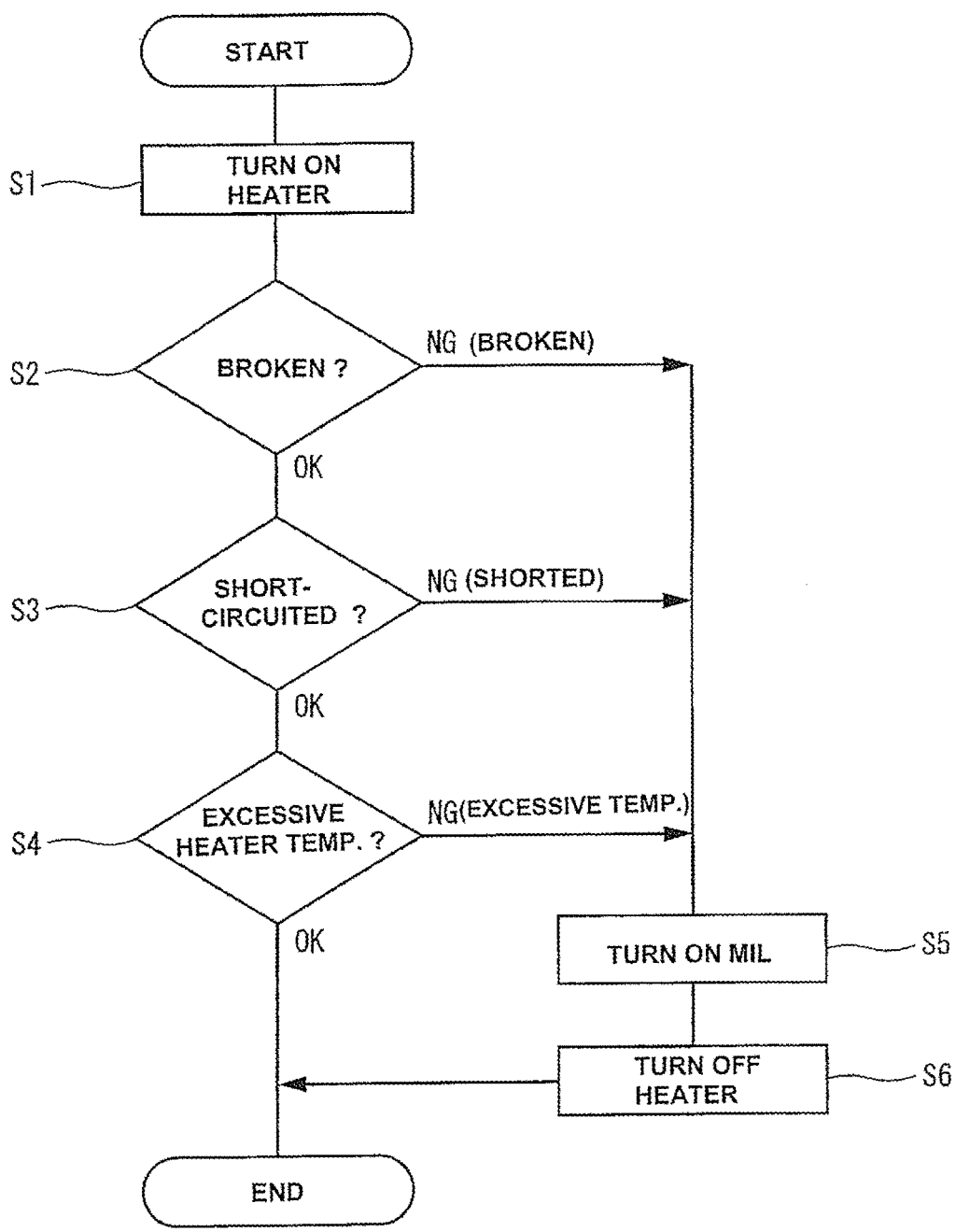
FIG. 13 is a flowchart illustrating ON/OFF control of the heater.

Referring to FIG. 13, there is shown the flowchart illustrating one example of a heater control routine executed within the engine control unit 38 for controlling operation of heater 19. At step S1, heater 19 is turned ON. With the heater 19 turned ON, the routine proceeds to step S2. Through a series of steps S2-S4, several heater/heater control circuit failures (abnormalities or malfunctions) are determined or diagnosed. At step S2, a check is made to determine whether a broken wiring harness is present or absent. At step S3, a check is made to determine whether a shorted wiring harness is present or absent. At step S4, a check is made to determine whether an excessively high heater temperature is present or absent. The presence or absence of broken harness, the presence or absence of shorted harness, and the presence or absence of excessive heater temperature can be determined or diagnosed based on an amount of electric current flowing through the heater 19. When the broken wiring harness is present, or when the shorted wiring harness is present, or when an excessive heater temperature is present, the routine proceeds to step S5. At step S5, the malfunction indicator light (warning light) 85 is turned ON. Thereafter, the routine proceeds to step S6. At step S6, heater 19 is turned OFF.

In the shown embodiment, the heater 19 of the present invention is applied to or exemplified in the substantially cylindrical buffer canister 3 of the evaporative fuel processing apparatus of the automotive vehicle. It will be appreciated that the invention is not limited to the previously-discussed buffer canister, but the inventive concept may be widely applied to another type of canister containing an adsorption material in a canister case and having a shape and a configuration different from the buffer canister 3 of the shown embodiment.

The entire contents of Japanese Patent Application No. 2015-240715 (filed Dec. 10, 2015) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A heater for a canister comprising:
   a metal heater case, which is formed into a hollow tubular shape sealed at a top and embedded within an adsorption material contained in a canister case;
   a heater core having a heat generation element sandwiched by a pair of strip-shaped ceramic plates, and inserted and arranged in the heater case, and equipped with terminals led out of a bottom end of the heater core;
   an elastic member having a heat conductivity and arranged between an outside surface of at least one of the pair of strip-shaped ceramic plates and an inner wall surface of the heater case facing the outside surface of the at least one strip-shaped ceramic plate; and
   a synthetic-resin cap member having a heater retaining hole to which a connector portion of a bottom of the heater case is fitted in a hermetically-sealed state, and fitted onto a bottom-end opening of the canister case so as to hermetically cover the bottom-end opening.

2. The heater as recited in claim 1, wherein: the connector portion has at least one slip-off preventing annular protrusion integrally formed on an outer periphery of the connector portion and fitted to the heater retaining hole.

3. The heater as recited in claim 1, wherein:
   the heater case has a combined heat-radiation fin structured by radial fin portions configured to extend radially outwardly straight from an outer peripheral surface of the heater case and circular-arc shaped fin portions configured to extend circumferentially around a center line of the heater case, the radial fin portions and the circular-arc shaped fin portions being combined together.

4. The heater as recited in claim 1, wherein:
   the elastic member comprises a belt-shaped leaf spring having a plurality of elastic claw pieces.

* * * * *